May 31, 1938.  J. G. LAWRENCE  2,119,504
FISHING TACKLE
Filed Nov. 25, 1935
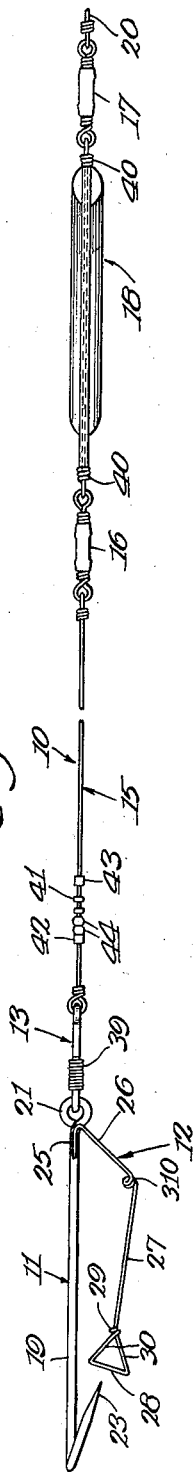
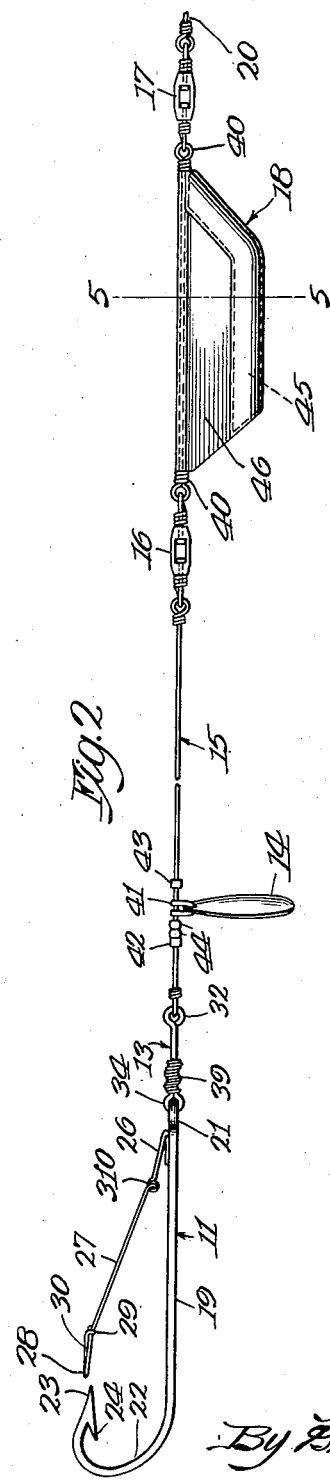
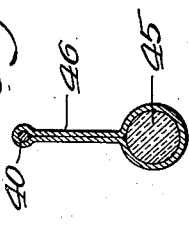
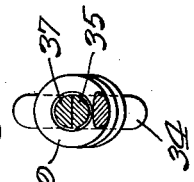
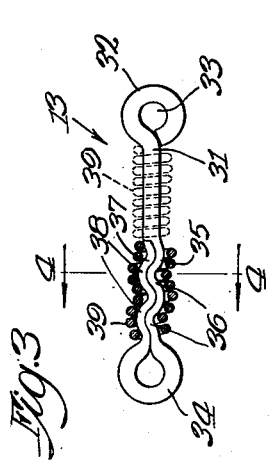
Inventor:
John G. Lawrence
By Gibson, Mann & Co.
Attys.

Patented May 31, 1938

2,119,504

UNITED STATES PATENT OFFICE 2,119,504

FISHING TACKLE

John G. Lawrence, Tampa, Fla.

Application November 25, 1935, Serial No. 51,372

2 Claims. (Cl. 43—27)

This invention relates to fishing tackle and more particularly to the hook and sinker type of tackle.

One of the objects of the invention is the provision of a new and improved means for preventing fish hooks while in use from becoming entangled in weeds, grass or the like.

Another object of the invention is the provision of a new and improved transparent sinker having novel means for preventing its becoming entangled or caught in weeds, grass or other obstructions in the water during its use.

A further object of the invention is the provision of new and improved mechanism for preventing twisting or snarling of the tackle while the same is being used.

A still further object of the invention is the provision of new and improved means for connecting the hook to the leader whereby the former may be easily and readily removed or replaced.

A further object of the invention is the provision of new and improved fishing tackle which may be manufactured at a minimum cost, which may be easily and readily assembled and that is simple in construction and efficient in use.

My improvements will be readily understood from the following description, taken in connection with the accompanying drawing, in which:

Fig. 1 is a plan view of the tackle;

Fig. 2 is a similar view taken at right angles from that shown in Fig. 1;

Fig. 3 is a plan view of the connector with parts in section;

Fig. 4 is a section on the line 4—4 of Fig. 3;

Fig. 5 is a section on the line 5—5 of Fig. 2.

In using fishing tackle in water containing weeds, grass and other obstructions, great difficulty is usually experienced in attempting to prevent the tackle from becoming entangled in the obstructions or in disengaging the same after it does become entangled.

The present invention seeks to eliminate this difficulty by the provision of new and improved means for preventing the hook from engaging obstructions and for guarding the sinker from becoming lodged, caught or entangled in the grass, weeds or other obstructions in the water in which the tackle is used.

Referring now to the drawing, the reference character 10 designates a fishing tackle which comprises a hook 11, a weed guard 12, a connector member 13, a spoon 14, a snell or leader 15, swivel members 16 and 17, a sinker 18 and a line 20. The hook comprises a shank 19 terminating at its upper end in an eye 21 having at its lower end a hook portion 22. The hook portion terminates in the usual point 23 and a barb 24, which may be bent laterally, as shown in Fig. 1 of the drawing. Attached to the shank of the hook adjacent its upper end is the weed guard 12 which is preferably of fine, resilient wire rigidly connected at its upper end to the shank 11, as at 25, and extends outwardly and downwardly as at 26, and has its lower end portion 27 bent downwardly and laterally, terminating adjacent the point of the hook. The lower end of the portion 27 may be, and preferably is, bent to extend transversely to the point, as shown at 28 in Fig. 1. The lower end of the wire may be bent upwardly from the portion 28 and wrapped about the lower portion 27, as shown at 29. The end portion may be bent to any suitable form for protecting the hook. By forming this portion of the guard in the shape of a triangle, as shown, the sides 30 of the triangle will assist in guiding the hook around obstructions.

In order to increase the resiliency of the guard, the same may be provided with one or more coils 310 intermediate its upper and lower ends. The guard 27 is preferably of light material so that it will not interfere with the fishing operation or interfere with the fish striking or taking the hook, but will be heavy enough to guide the hook and prevent the same from hooking grass, weeds or other obstructions.

It is desirable that means be provided whereby the hook 11 may be removed from the snell 15 so that a different type or size of hook may be substituted if the fisherman so desires. In the form of the construction selected to illustrate one embodiment of the invention, the connector member 13 is employed for this purpose. This member comprises a body portion 31 (see Fig. 3) which terminates at one end in a loop 32, forming an eye 33 to which the leader or snell 15 is connected. The opposite end of the connector 13 is bent intermediate its ends to form an eye 34. The part of the connector between the body portion 31 and the loop 34 is semi-circular in cross section, as shown at 35 in Fig. 4, and is corrugated as shown at 36 in Fig. 3. The free end of the loop 34 is also semi-circular in cross section, as shown at 37 in Fig. 4, and is provided with corrugations 38 which nest with the corrugations 36. The semi-circular portions 35 and 37 together form a sinuous portion having a diameter substantially the same as that of the body portion 31.

Suitable means is provided for holding the portions 35 and 37 from separating when the hook has been attached. As shown, a closely wound helical spring or resilient sheath 39, having an internal diameter slightly greater than the diameter of the body portion 31, is employed for this purpose. The spring or sheath 39 is of substantially the same length as the body portion 31 and is adapted to be slid over the corrugations 36 and 38. When in the position shown in Fig. 3 the portions 35 and 37 will be held in contact, and, due to the sinuous or corrugated form of this portion of the connector, the spring or resilient sheath 39 will conform to the corrugations and will be held in the position shown by the friction of the parts. When it is desired to change hooks, the sheath 39 is moved to the dotted line position shown in Fig. 3 onto the body portion 31, the semi-circular end 37 separated from the part 35, and the old hook removed and a new one placed in position, after which the sheath is moved to the full line position shown in Fig. 3 over the corrugations for preventing separation of parts 35 and 37.

The spoon 14 is held on a snell or leader 15 by a loop member 41 slidably mounted on the snell between abutments 42 and 43 fixed on the snell. Anti-friction members 44 are preferably mounted on the snell between attaching loops 41 and the lower fixed abutment 42, as is usual in such constructions. Since the specific construction of the spoon or spinner and its mounting constitutes no part of the present invention, it is not thought necessary to further illustrate or describe the same.

In fishing with hook and line, it is common practice to employ sinkers of lead or other opaque material. The use of opaque material is objectionable because of its being readily seen by the fish and its movement in the water tends to frighten the same from the vicinity of the hook. In order to remedy this difficulty, the sinker 18 is of transparent material. In the form of the construction shown, the sinker comprises a length of glass rod 45 which is attached to the link 40 of the snell or leader 15 in any suitable manner. As shown, the rod 45 is bent at an obtuse angle and is secured to the link 40 by a strip of transparent material 46, such as celluloid or material of phenolic or other composition, which is looped about the link 40 and rod 45, as shown in Figs. 2 and 5. The glass rod lends sufficient weight to the sinker, and the celluloid protects the glass from breakage. But even if the glass becomes shattered, it will be retained within the pocket formed by the celluloid. The end portions of the sinker are inclined or tapered from the outer side whereby a minimum of resistance is offered to the sliding of the sinker over or around grass, weeds or other obstructions without catching or hanging on the same when the line is reeled in. Furthermore, the tapering of both ends enables the sinker to be reversible—that is, it may be turned end for end, if desired.

Suitable means are provided for permitting the hook 19 to rotate relative to the line, or for permitting the sinker to rotate independently of the hook, thereby preventing twisting and snarling of the line. In the form of the construction shown, swivel members 16 and 17 are employed above and below the sinker 18 for this purpose. The link 40 has its ends bent to form eyes which engage eyes in the ends of the swivel members 16 and 17. The line 20 is attached to the upper eye or end of the swivel member 17. This arrangement also results in the heavy portion 18 hanging below the link 40 where it is free to turn laterally to either side of the line to avoid entanglement with obstructions.

It is thought from the foregoing taken in connection with the accompanying drawing that the construction and operation of my device will be apparent to those skilled in the art and that changes in size, shape, proportion and details of construction may be made without departing from the spirit and scope of the appended claims.

I claim as my invention:

1. In a fishing tackle, a leader, a sinker, and means for connecting said sinker to said leader, said sinker comprising a link, a transparent weight and transparent means for connecting said weight to said leader.

2. In a fishing tackle, a leader, a sinker, means for connecting said sinker to said leader, said sinker comprising a glass rod bent at an obtuse angle and a link, a strip of transparent material extending about said rod and link, and a swivel for connecting said rod to said leader.

JOHN G. LAWRENCE.